United States Patent [19]

Davies

[11] Patent Number: 4,865,922
[45] Date of Patent: Sep. 12, 1989

[54] PLAIN BEARING

[75] Inventor: Glyndwr Davies, Cowley Uxbridge, United Kingdom

[73] Assignee: AEPLC, Warwickshire, England

[21] Appl. No.: 77,113

[22] Filed: Jul. 23, 1987

Related U.S. Application Data

[63] Continuation of Ser. No. 789,726, Oct. 21, 1985, abandoned.

[30] Foreign Application Priority Data

Oct. 22, 1984 [GB] United Kingdom ................. 8426637

[51] Int. Cl.[4] .......................... B22F 7/04; B32B 15/16
[52] U.S. Cl. .................................... 428/551; 428/557; 428/564; 252/12; 384/910
[58] Field of Search ............... 428/551, 553, 557, 564, 428/565; 75/231, 252; 252/12; 308/DIG. 8, DIG. 9, 5 R; 384/300, 910

[56] References Cited

U.S. PATENT DOCUMENTS

| 2,995,462 | 8/1961 | Mitchell et al. | 75/252 |
| 3,305,325 | 2/1967 | Le Brasse et al. | 75/231 |
| 3,380,843 | 4/1968 | Davis | 252/12 |
| 3,419,363 | 12/1968 | Sliney | 384/300 |
| 3,743,556 | 7/1973 | Breton et al. | 75/231 |
| 3,953,343 | 4/1976 | Sliney | 252/12 |
| 4,136,211 | 1/1979 | Sliney | 252/12.2 |
| 4,189,522 | 2/1980 | Mori | 428/557 |
| 4,214,905 | 7/1980 | Sliney | 419/58 |
| 4,582,368 | 4/1986 | Fujita et al. | 308/5 R |

Primary Examiner—Stephen J. Lechert, Jr.
Assistant Examiner—Eric Jorgensen
Attorney, Agent, or Firm—Price, Heneveld, Cooper, DeWitt & Litton

[57] ABSTRACT

A cavitation erosion resistant plain bearing comprising a steel backing, a sintered bronze interlayer and a lining of PTFE filled with 1 to 50% by volume of an ionic fluoride of low aqueous solubility.

17 Claims, 3 Drawing Sheets

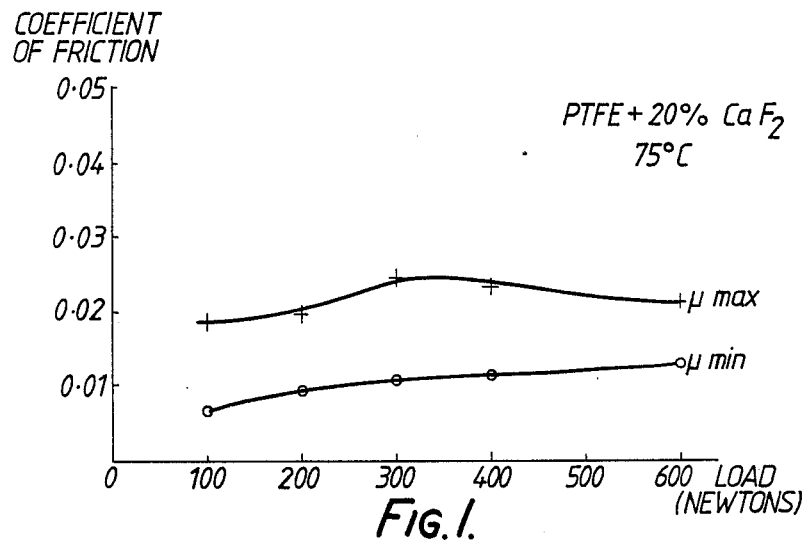
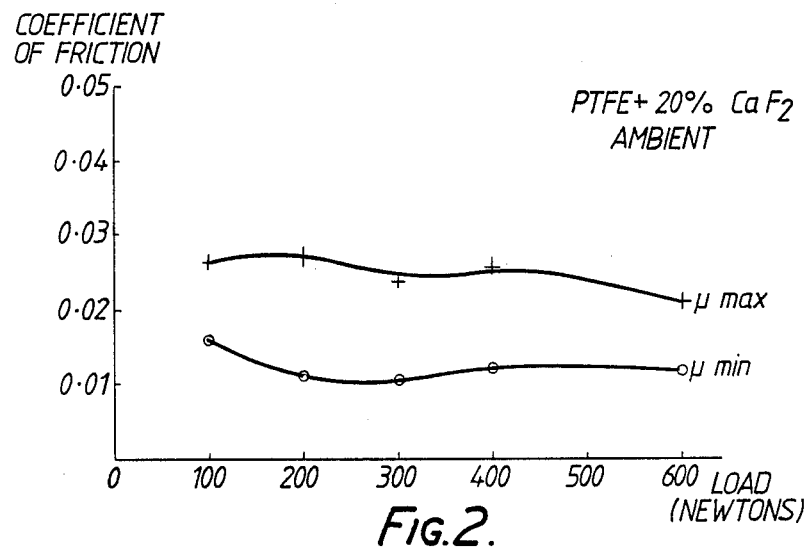

PLAIN BEARING

This is a continuation of application Ser. No. 789,726, filed Oct. 21, 1985, now abandoned.

The present invention relates to plain bearings, in particular, oil-lubricated bearings where very low friction, particularly static (breakaway) friction is essential, such as for automotive shock absorbers of the McPherson strut type.

Because of the requirement for very low friction, in these situations, in general only bearing materials with a very high proportion of Polytetrafluoroethylene (PTFE) in the sliding surface are suitable since no material other than PTFE appears to be able to achieve the low friction levels required. However, PTFE alone is very soft and weak and has an unacceptably high wear rate, thus harder materials must be added to the PTFE bearing surface to reduce wear and give an acceptable bearing life.

Bearings currently used in these applications consist of a steel backing having a porous bronze sinter layer and a bearing layer comprising filled PTFE. The bearing layer fills the intersticies of the sinter and forms a thin layer (approx. 25 microns) above the sinter. The most widely used compositions consist of PTFE filled with either 20% by volume lead or molybdenum disulphide.

These conventional materials tend to suffer erosion effects when used under severe conditions in which cavitation occurs in the lubricating oil. Such conditions can occur at high counterface velocities in such applications as gear pumps and aviation fuel pumps, and automotive shock absorbers where the rod speed relative to the bearing surface moves at abnormally high speeds (greater than 3 m/sec.). This form of cavitation erosion results in the removal of the filled PTFE phase from the sinter by the action of the lubricating oil alone, without rubbing wear.

It is an object of the present invention to provide a plain bearing having a stronger filled PTFE phase with greater mechanical integrity than the conventional materials.

According to the invention there is provided a plain bearing comprising a metal backing, a sinter layer on the backing and a bearing layer on the sinter, the bearing layer comprising PTFE and an ionic fluoride of low water solubility.

The incorporation of such a fluoride may improve the mechanical integrity of the bearing material since the fluoride may be chemically more compatible with the PTFE than the conventional fillers which are not wetted at all by PTFE and thus have no bonding to the polymer.

A composition for the bearing material in accordance with the invention tends to show very much enhanced cavitation erosion-resistance while retaining the desirable friction and wear properties of the conventional materials.

Preferably, the backing is of steel and the sinter layer is preferably of tin-bronze or aluminium-bronze The fluoride is preferably in a finely-divided form within the PTFE phase, having a particle size range of 0.01 to 10 microns, preferably 0.1 to 1 micron. The fine sub-micron particle size has been shown to be beneficial; compositions containing precipitated calcium fluoride tend to be superior in cavitation erosion-resistance to those containing ground native calcium fluoride powder of particle sizes larger than one micron.

The fluoride may be present in an amount of 1 to 50% by volume, preferably 10 to 30% by volume for example 20% by volume. The solubility of the fluoride in water is preferably below 0.05 g per 100 $cm^3$ at 18° C. The adverse effect of water solubility may be associated with the method of incorporation of the filler into the PTFE, which is carried out in aqueous suspension using an aqueous dispersion of PTFE.

The low solubility fluorides are preferably of metals from Group IIA of the Periodic Table of the Elements. Thus, suitable fluorides are $MgF_2$, $SrF_2$ and $CaF_2$ with the latter being the most preferable. Those fluorides with higher solubilities tend to be unsuitable. These fluorides may be used alone or in combination. The bearing material may also incorporate metallic lead, though preferably, the combined amount of fluoride and lead should not exceed 50% by volume.

The invention also extends to the bearing material composition per se, as described above.

The invention may be carried into practice in various ways and some embodiments will now be illustrated in the following Examples.

EXAMPLE 1

Calcium fluoride was prepared by precipitation from a saturated aqueous solution of sodium flouride by the additions of aqueous calcium chloride solution.

The precipitate was separated and washed free of sodium and chloride ions by centrifuging and filtration followed by drying and pulverising.

This technique produced a very fine material of partical size below one micron. The crystalline structure of the material was not the classical fluorite structure, but more like an amorphous gel, the composition of which did not entirely correspond to the stoichiometric $CaF_2$ but was hydrolysed to some extent resulting in about 10% hydroxyl groups present.

1.7 kg of this material was thoroughly mixed with 5 kg of PTFE and the mixture rolled onto a substrate of steel strip coated with a layer of sintered bronze powder of particle size less than 120 mesh size. The PTFE was then sintered by heating for one to three minutes at 360° to 380° C.

Bushes were then manufactured from this strip and tested as the guide bushes in McPherson strut units. For comparison, propriety bushes of two other compositions were tested in the same strut units, i.e. 20% $MoS_2$ filled PTFE and 20% lead filled PTFE. The results of tests run at high rod speeds are presented in Table 1.

TABLE I

| Results of High Rod Speed Strut Tests | | |
|---|---|---|
| Filler Compositon percentage by volume in PTFE | Strut Rod Speed m/sec | Result |
| 20% $MoS_2$ | 2.5 | Cavitation Erosion in 50% of tests |
| 20% Pb | 2.5 | No Cavitation Erosion at all |
| 20% $CaF_2$ | 2.5 | No Cavitation Erosion at all |
| 20% $MoS_2$ | 3.0 | Cavitation Erosion in 100% of tests |
| 20% Pb | 3.0 | Cavitation Erosion in 75% of tests |

TABLE I-continued

Results of High Rod Speed Strut Tests

| Filler Compositon percentage by volume in PTFE | Strut Rod Speed m/sec | Result |
| --- | --- | --- |
| 20% CaF$_2$ | 3.0 | No cavitation Erosion at all |
| 20% MoS$_2$ | 3.3 | Cavitation Erosion in 100% of tests |
| 20% Pb | 3.3 | Cavitation Erosion in 100% of tests |
| 20% CaF$_2$ | 3.3 | Cavitation Erosion in 25% of tests |

Table I shows the results of High Rod Speed Tests carried out on bearings for strut Rods in which various lining compositions were used. The cavitation erosion observed in the case of 20%CaF$_2$ in PTFE was noticeably less than in the case of the prior art compositions incorporating 20%Pb and 20% MoS$_2$ PTFE.

The wear life of bushes tested at rod speeds of 2 m/sec with an applied side load of 100 kg are presented in Table II.

TABLE II

| Composition | Life to Failure Hours |
| --- | --- |
| 20% CaF$_2$ | 975 |
| 20% CaF$_2$ | 1015 |
| 20% CaF$_2$ | 805 |
| 20% Lead | 290 |
| 20% Lead | 310 |
| 20% Lead | 315 |
| 20% MoS$_2$ | 80 |
| 20% MoS$_2$ | 290 |
| 20% MoS$_2$ | 160 |

It should be noted from Table II that the material in accordance with the invention gave more than twice the wear life of the best result from the propriety materials. Failure was judged to have occurred when more than 10% of the lining had worn away to a depth of 25 micrometers or more.

EXAMPLE 2

Agnesium flouride was prepared by the action of aqueous hydrofluoric acid on a suspension of magnesium carbonate. The precipitate was washed, filtered and dried.

This material was compounded with PTFE bonded to porous bronze sinter as described in Example 1.

The material was tested for cavitation erosion resistance along with lead filled and MoS$_2$ filled proprietry strut materials and showed superior results as illustrated in table III. Quoted figures are the mean volume loss of ten tests for each material.

TABLE II

Results of Ultrasonic Cavitation Tests

| Filler Composition percentage by volume in PTFE | Mean Volume loss × 10$^{-3}$ cm$^3$ |
| --- | --- |
| 20% Lead | 3.8 |
| 20% MoS$_2$ | 8.5 |
| 20% CaF$_2$ | 0.4 |
| 10% Pb & 10% CaF$_2$ | 1.3 |
| 20% MgF$_2$ | 0.9 |
| 20% SrF$_2$ | 1.3 |

Table I shows the results of Ultrasonic Cavitation Tests carried out on bearings having linings of various bearing material compositions. As can be seen, the mean volume loss in the case of compositions in accordance with the invention was considerably lower than with prior art compositions.

The superior properties of a material in accordance with the invention will also be illustrated in the accompanying drawings, in which:

FIG. 1 are graphs of the coefficient of friction plotted against the load applied to a bush having a lining of PTFE+20% CaF$_2$ at a temperature of 75° C.;

FIG. 2 is a similar graph, the lining being of PTFE+20% CaF$_2$ but at ambient temperature;

Figure 5:
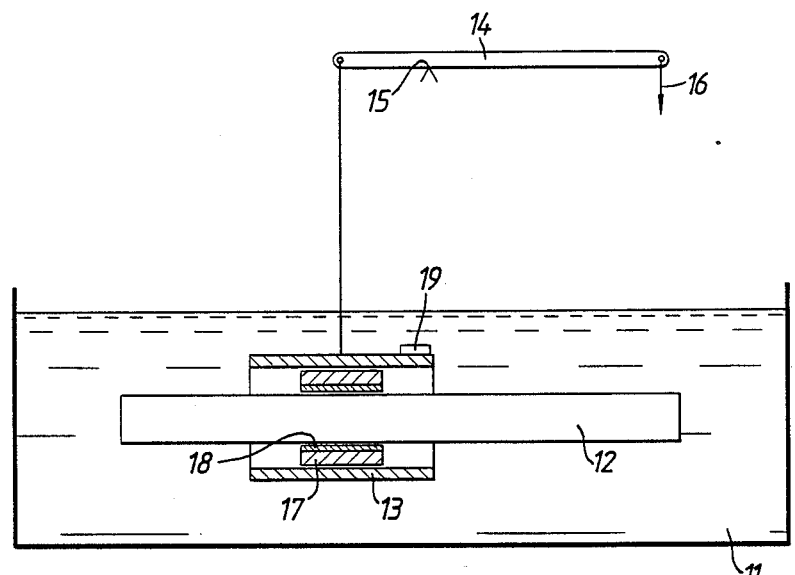
FIG. 5 is a schematic view of the apparatus used to derive the results shown in FIGS. 1 to 4.

Referring firstly to FIG. 5, the testing apparatus comprises an oil bath 11, and a reciprocating steel shaft 12 and bearing housing 13, both immersed in the bath 11. The bearing housing 13 is suspended from one end of the lever arm 14 which is pivoted at 15. Varying loads 16 are attached to the other end of the lever arm 14, thereby exerting a force on the bearing housing 13.

To test a bearing material, a bush 17 having a lining 18 of the test material is located about the shaft 12 within the bearing housing 13. A load 16 is applied and the shaft 12 is reciprocated at an average shaft speed of 1.78 m/s. A strain gauge 19 on the bearing housing 13 measures the force required to move the shaft 12 by sliding and from this value, the coefficient of lubricated sliding friction $\mu$ can be calculated.

Turning now to the graphs, FIG. 1 shows the coefficient of friction $\mu$ against the applied load 16 at a bath temperature of 75° C. The value $\mu$ max is the maximum force that is required to initiate sliding of the shfat 12. The value $\mu$ min is the minimum force required to maintain the shaft 12 in sliding motion. The material 18 under test in this case is PTFE+20% CaF$_2$.

FIG. 2 is equivalent to FIG. 1 but in this case, the bath temperature is ambient.

Figure 3:
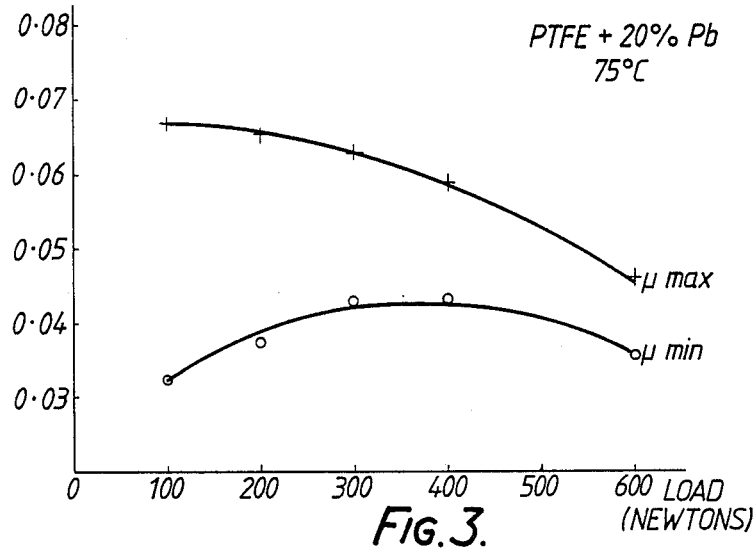
FIG. 3 is a similar graph, the lining being of PTFE+20% Pb at a temperature of 75° C.

FIG. 3 is similar to FIGS. 1 and 2 but in this case, the material under test is PTFE+20% Pb and the bath temperature is 75° C.

Figure 4:
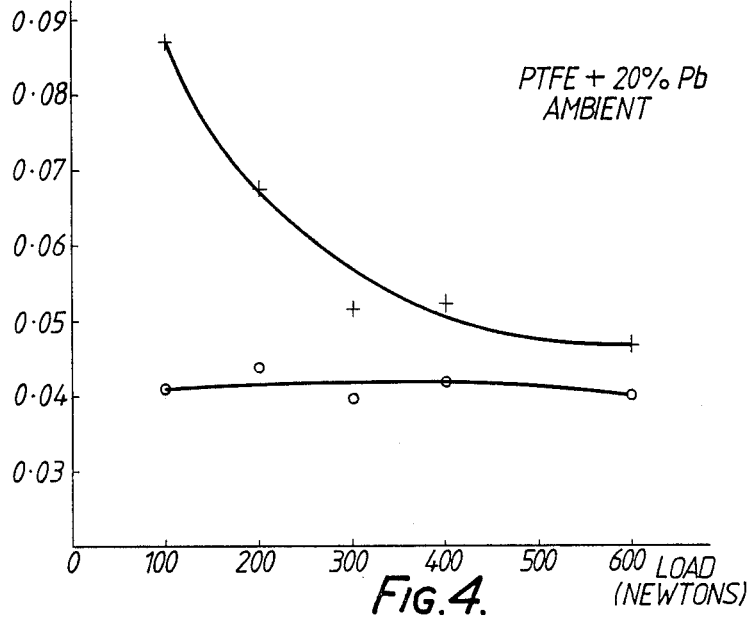
FIG. 4 is a similar graph, the lining being of PTFE+20% Pb but at ambient temperature.

FIG. 4 is equivalent to FIG. 3 but in this case, the bath temperature is ambient.

From FIGS. 1 to 4 it can clearly be seen that the coefficient of friction for the material in accordance with the invention (FIGS. 1 and 2) is a factor of 2 to 3 lower than that of the known material (FIGS. 3 and 4), depending upon the load applied. It can also be been that the coefficient of friction for the material in accordance with the invention, particularly the maximum value to initiate sliding, is more nearly constant to that of the known material, whose $\mu$ max is considerably higher at lower loads.

Obviously, numerous modifications and variations of the present invention are possible on the light of the above teachings. It is therefore to be understood that within the scope of the appended claims, the invention may be practiced otherwise than as specifically described herein.

I claim:

1. A plain bearing comprising a metal backing, a sinter layer on said metal backing and a bearing layer on said sinter layer, said bearing layer comprising a surface layer of polytetrafluoroethylene (PTFE) including 1 to 50% by volume of an ionic fluoride selected from the group consisting of $CaF_2$, $MgF_2$, $SrF_2$ and mixtures thereof precipitated from an aqueous solution and having a solubility in water which is less than 0.5 $g/cm^3$ at 18° C., the ionic fluoride being in a finely divided form in the PTFE, the particle size being in the range from 0.01 to 10 microns.

2. A bearing according to claim 1 wherein said backing is of steel.

3. A bearing according to claim 2 wherein said sinter layer is sintered bronze.

4. A bearing according to claim 1 wherein said fluoride is a fluoride selected from the group consisting of $CaF_2$, $MgF_2$ and $SrF_2$.

5. A bearing according to claim 4 wherein said surface layer further incorporates metallic lead.

6. A plain bearing as described in claim 1 wherein the particle size of said fluoride is in the range of 0.1 to 1 micron.

7. A plain bearing according to claim 1 wherein said fluoride is a combination of two or more of the fluorides selected from the group consisting of $CaF_2$, $MgF_2$ and $SrF_2$.

8. A plain bearing according to claim 1 wherein said fluoride is $CaF_2$.

9. A plain bearing according to claim 1 wherein said fluoride is $CaF_2$ having a particle size in the range of 0.1 to 1 micron.

10. A bearing according to claim 1 wherein the ionic fluoride is precipitated $CaF_2$.

11. A bearing according to claim 1 wherein the ionic fluoride is precipitated $CaF_2$ and has a particle size in the range of 0.1 to 1 micron.

12. A plain bearing comprising a metal backing, a sinter layer on said metal backing and a bearing layer on said sinter layer, said bearing layer comprising a surface layer of polytetrafluoroethylene containing from 1 to 50 volume percent of at least one ionic fluoride selected from the group consisting of $CaF_2$, $MgF_2$, $SrF_2$ and mixtures thereof having a water solubility not greater than 0.05 grams per cubic centimeter at 18° C. and a particle size in the range from 0.01 to 10 microns.

13. A plain bearing according to claim 12 wherein said fluoride comprises $CaF_2$.

14. A plain bearing according to claim 13 wherein said fluoride has a particle size in the range from 0.1 to 1 micron.

15. A plain bearing according to claim 12 wherein the particle size of said fluoride is in the range from 0.1 to 10 microns.

16. A plain bearing according to claim 12 wherein the particle size of said fluoride is in the range from 0.1 to 1 micron.

17. A plain bearing according to claim 12 wherein said fluoride is a combination of two or more of the fluorides selected from the group consisting of $CaF_2$, $MgF_2$, $SrF_2$ and mixtures thereof.

* * * * *

UNITED STATES PATENT AND TRADEMARK OFFICE
CERTIFICATE OF CORRECTION

PATENT NO. : 4,865,922

DATED : September 12, 1989

INVENTOR(S) : Glyndwr Davies

It is certified that error appears in the above-identified patent and that said Letters Patent is hereby corrected as shown below:

Column 3, line 53:

"Table II" should be -- Table III --.

Column 4, line 44:

"shfat" should be -- shaft --.

Signed and Sealed this

Twenty-third Day of April, 1991

Attest:

HARRY F. MANBECK, JR.

Attesting Officer

Commissioner of Patents and Trademarks